United States Patent

Delmer et al.

[11] Patent Number: 5,192,027
[45] Date of Patent: Mar. 9, 1993

[54] DRIP IRRIGATION DEVICES AND PLASTIC FILMS WITH COPPER POWDER INCORPORATED

[76] Inventors: Daniel W. C. Delmer, 17067 Roundhill Dr.; Robert J. Delmer, 16922 Pacific Coast Hwy., #204; William A. Delmer, 16901 Bedford La., all of Huntington Beach, Calif. 92649

[21] Appl. No.: 834,006
[22] Filed: Feb. 11, 1992
[51] Int. Cl.⁵ .......................... B05B 1/02; B05B 15/00
[52] U.S. Cl. ..................................... 239/542; 405/43; 405/45
[58] Field of Search ................... 239/542, 547; 405/43, 405/45

[56] References Cited

U.S. PATENT DOCUMENTS

| | | |
|---|---|---|
| 2,727,832 | 12/1955 | Christensen et al. |
| 3,097,932 | 7/1963 | Goldheim |
| 3,467,142 | 9/1969 | Boyle et al. |
| 3,929,258 | 12/1975 | Stephens ........................ 239/542 X |
| 4,037,791 | 7/1977 | Mullett et al. ...................... 239/542 |
| 4,111,879 | 9/1978 | Mori et al. |
| 4,143,820 | 3/1979 | Bright, Sr. ........................ 239/542 X |
| 4,196,853 | 4/1980 | Delmer ............................ 239/547 X |
| 4,235,380 | 11/1980 | Delmer ............................ 239/542 X |
| 4,354,639 | 10/1982 | Delmer ............................ 239/542 |
| 4,428,989 | 1/1984 | Marshall . |
| 4,548,360 | 10/1985 | Delmer et al. .................... 239/542 |
| 4,789,005 | 12/1988 | Griffiths . |
| 5,019,311 | 5/1991 | Koslow . |
| 5,147,722 | 9/1992 | Koslow . |

Primary Examiner—Andres Kashnikow
Assistant Examiner—William Grant
Attorney, Agent, or Firm—Harris, Kern, Wallen & Tinsley

[57] ABSTRACT

A length of plastic with a copper powder adhered to a surface thereof along its length for control of growth of algae and the like, and method and apparatus for producing such a product. A multi-chamber drip irrigation hose for distributing water and the like having a larger primary tube and a smaller secondary tube of flexible water impermeable material and joined at a common wall having passages facing the interior of the primary tube in communication with the interior of the secondary tube and having passages leading from the interior of the secondary tube to the exterior, with a copper powder adhered to at least one inner surface along the length of the tube, with the powder being in a continuous layer or in a non-continuous layer. In one embodiment the copper powder is applied from a reservoir onto a plastic film by brushing directly onto the film or by transfer from a rotating wheel carrying the copper powder. In other embodiments, the power is applied during the formation of the plastic film as by extruding, blowing or molding.

3 Claims, 3 Drawing Sheets

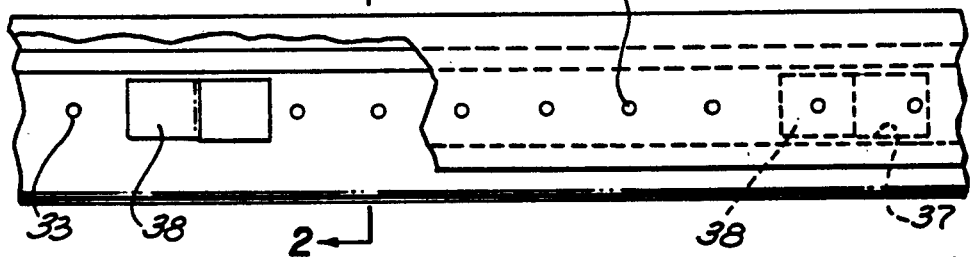
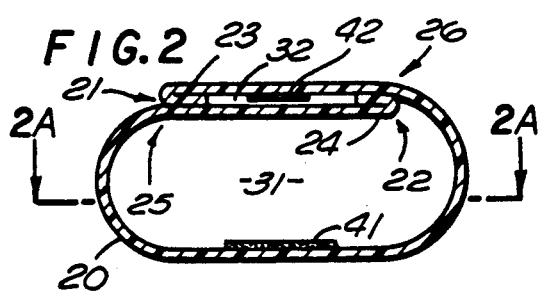
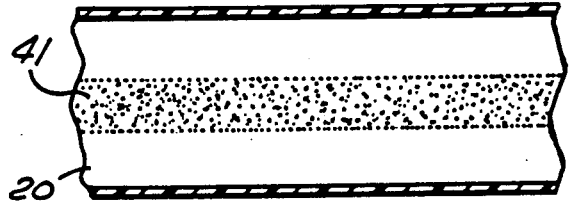
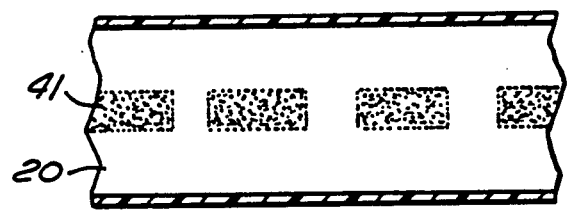
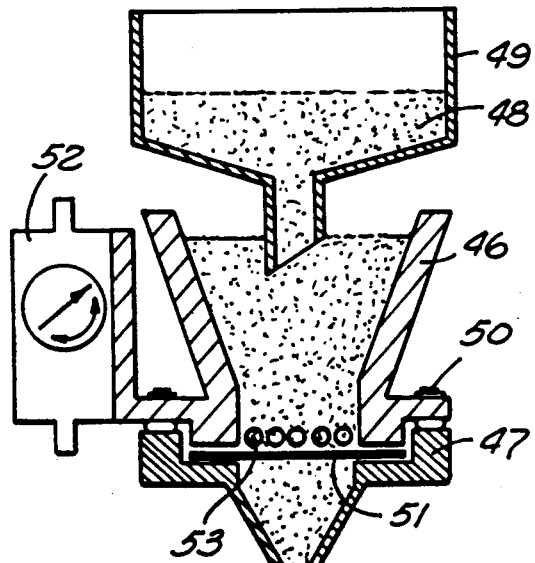
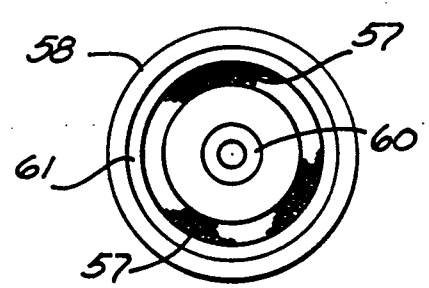
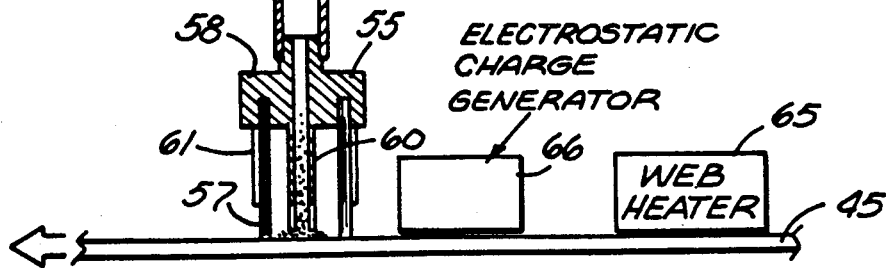

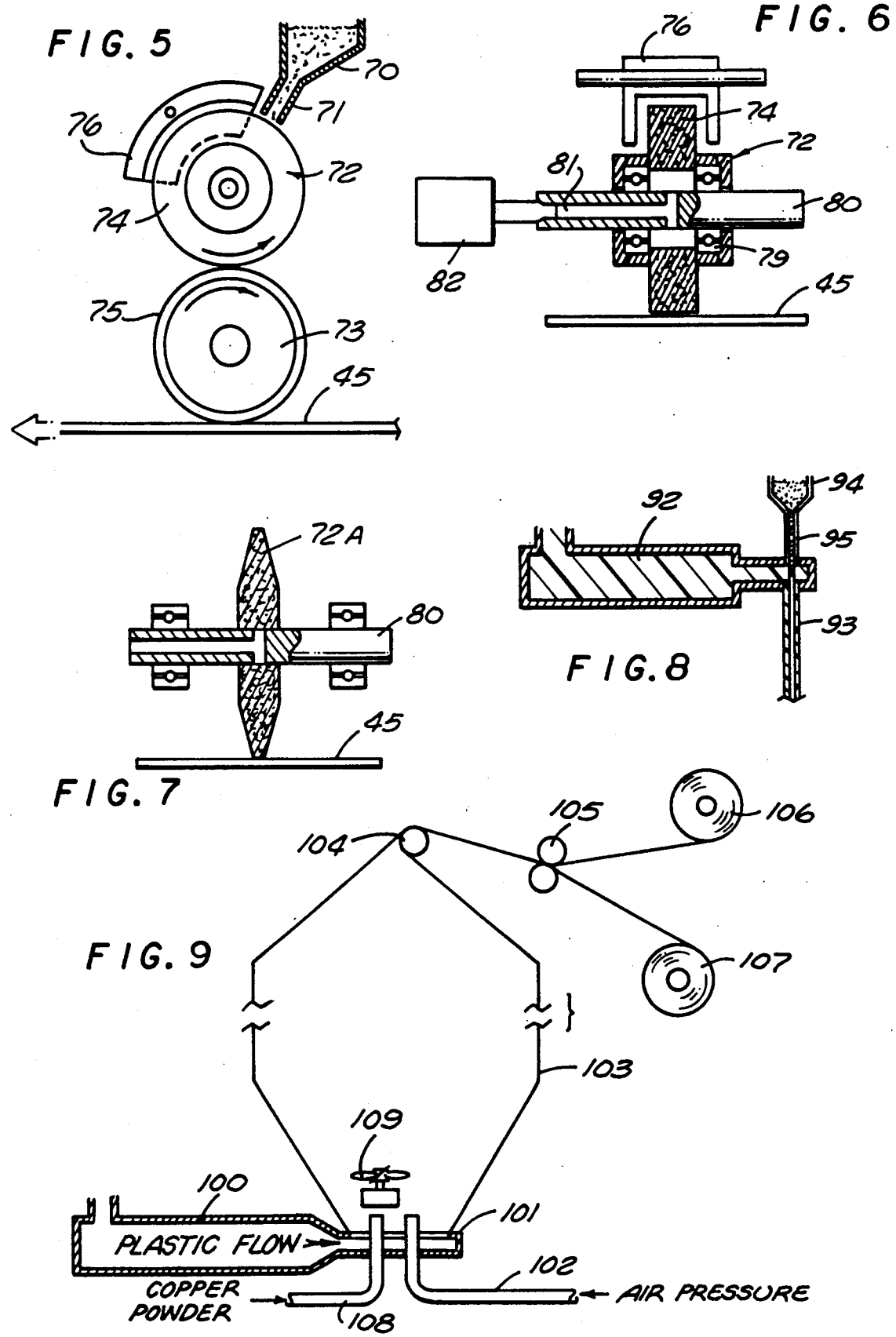

DRIP IRRIGATION DEVICES AND PLASTIC FILMS WITH COPPER POWDER INCORPORATED

BACKGROUND OF THE INVENTION

This invention relates to plastic films and tubes such as plastic drip irrigation hose and other plastic products which are used with water. Different forms of drip irrigation devices are shown in the Delmer U.S. Pat. No. 4,548,360 and in the references of record in that patent.

One of the problems encountered in articles of this type is clogging of relatively small flow passages resulting from the growth of biological products such as algae and bacterial slimes.

It is known that copper sulfate in solution is a biocide, combatting bacterial slimes and algaes. Also, other materials such as chlorine, sulfuric acid and hydrochloric acid have been introduced into water systems for control of biological growth. These practices have problems, including the necessity of continuous introduction of the biocide in small amounts and the adverse effect of the introduced materials on the plastic product.

Another approach to the problem is set out in the Boyle et al U.S. Pat. No. 3,467,142, . This patent discloses a flow distributor for connection to a source of water and having an elongated body of plastic with a main flow passage and a plurality of smaller flow passages with a copper wire positioned within one or more of the flow passages.

There are problems with this proposed type of construction. The physical presence of the copper wire in some of the flow passages is an impediment to water flow. Manufacturing the hose or other product with the copper wire therein is difficult and uncertain. In sugar cane fields the irrigation hose or tape is retrieved every three to five years, and in some fields hose is replaced every year. Retrieving and disposing of the copper wire in the hose would be near impossible. If the wire is left in the field, it would be dangerous and would become tangled in the farm machinery.

Accordingly, it is an object of the present invention to provide a new and improved plastic film with biocide incorporated and apparatus and method for making such product.

It is a particular object of the invention to provide a new and improved plastic drip irrigation hose with primary and secondary passages and incorporating a biocide.

Other objects, advantages, features and results will more fully appear in the course of the following description.

SUMMARY OF THE INVENTION

A length of plastic with a copper powder adhered to a surface thereof along its length for control of growth of algae and the like, and method and apparatus for producing such a product. In the presently preferred embodiment, multi-chamber drip irrigation hose for distributing water and the like having a larger primary tube and a smaller secondary tube of flexible water impermeable material and joined at a common wall having passages facing the interior of the primary tube in communication with the interior of the secondary tube and having passages leading from the interior of the secondary tube to the exterior, with a copper powder adhered to at least one inner surface along the length of the tube, with the powder being in a continuous layer or in a non-continuous layer. In one embodiment of the method and apparatus the copper powder is applied from a reservoir onto a plastic film by brushing directly onto the film or by transfer from a rotating wheel carrying the copper powder. In other embodiments, the powder is applied during the formation of the plastic film as by extruding, blowing or molding.

BRIEF DESCRIPTION OF THE DRAWINGS

FIG. 1 is a side view of a length of drip irrigation hose incorporating the presently preferred embodiment of the invention;

FIG. 2 is an enlarged sectional view taken along the line 2—2 of FIG. 1;

FIGS. 2A and 2B are longitudinal sectional views of the hose of FIGS. 1 and 2 showing a continuous layer of copper powder adhered to the plastic film and a non-continuous layer, respectively;

FIG. 3 is a side view, partly in section, showing a presently preferred embodiment of the invention;

FIG. 4 is a bottom view of the apparatus of FIG. 3;

FIG. 5 is a side view of another embodiment of the apparatus of the invention;

FIG. 6 is a sectional view of an apparatus similar to that shown in FIG. 5;

FIG. 7 is a sectional view similar to that of FIG. 6 showing an alternative embodiment of the invention;

FIG. 8 is a sectional view of another alternative embodiment of the apparatus of the invention;

FIG. 9 is a sectional view of another alternative embodiment of the invention;

DESCRIPTION OF THE PREFERRED EMBODIMENTS

Figure 10:
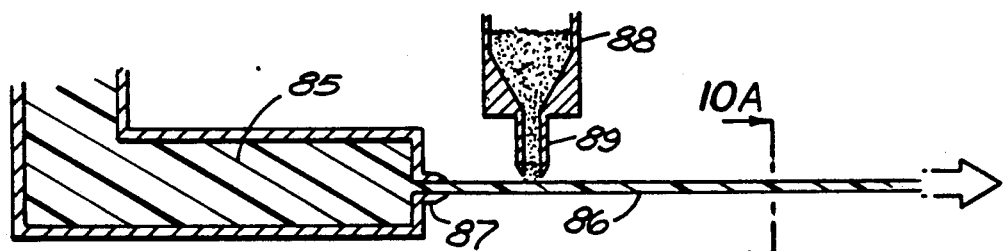
FIG. 10 is a sectional view of another alternative embodiment of the apparatus of the invention.

The drip irrigation hose of FIGS. 1 and 2 is formed from a film of flexible water impermeable material, typically a strip of plastic. As illustrated, the strip 20 has opposite parallel edges indicated at 21,22 in FIG. 2. The edge 21 is folded over on itself to produce a thicker edge 23, and the edge 22 is similarly folded over on itself to produce a thicker edge 24. Each folded over edge preferably is bonded to itself, as by an adhesive or heat sealing or otherwise as desired.

The initially flat strip with the thicker opposite edges is then folded to the configuration of FIG. 2, with the thicker edge 23 bonded to the strip at 25 and with the thicker edge 24 bonded to the strip at 26, to produce a larger primary tube 31 and a smaller secondary tube 32. With this configuration, the thicker edges provide a space between the two layers of the strip which form the secondary tube 32.

Passages 33 are provided in the common wall between the primary and secondary tubes for fluid flow from the primary tube to the secondary tube. Also, passages 34 are provided in an outer wall of the secondary tube for fluid flow from the secondary tube to the exterior. The rate of flow through the hose is controlled by the sizes of the primary and secondary tubes and by the sizes and number of passages utilized.

In some configurations it is desirable to separate the secondary tube into a plurality of chambers, either completely isolating the chambers one from another or merely restricting flow from one chamber to another. This may be accomplished by utilizing a presser roller to periodically form the secondary tube to produce a restriction in the tube or to actually periodically close the secondary tube. In the embodiment illustrated, a slitted flap is used, formed by a slit 37, typically U-shaped, in the common wall between the primary and secondary tubes, providing a flap 38 which is folded up to engage the wall of the secondary tube 22. With this arrangement, the passages 33 in the common wall may be omitted, with the opening resulting from the flap formation serving as the flow passage between the primary and secondary tubes.

The construction thus far described is conventional and various constructions for the drip irrigation hose may be utilized as desired.

In the construction of the invention, copper powder is adhered to at least one of the inner surfaces of one of the tubes. Copper powder is available commercially and is sold in a granular form and in a flake form. The term "copper powder" as used herein embraces both the granular form and the flake form.

The copper powder preferably is pure copper with a particle size in the range of about 5 to about 20 microns. The copper powder particles may be coated with stearic acid or other substances which permit only a slow release and provide minimum exposure or uncovering of the copper during application. Such coatings typically are submicron in thickness. Such copper powder is available from a number of sources, one of which is U.S. Bronze Powders, Incorporated. U.S. Bronze numbers 9720, 9020 and 280 are suitable copper powders, and number 280 is presently preferred. The copper powder need not be coated and may be dry or wet. These copper powders have a very high surface-to-weight ratio and easily remain airborne if not contained and controlled.

In the embodiment illustrated in FIGS. 1 and 2, the copper powder is adhered to the strip of plastic 20 prior to the folding operation. The copper powder may be adhered in a layer 41 on the surface that forms the inner surface of the primary tube 31 and/or in a layer 42 on the surface that forms the inner surface of the secondary tube 32. The copper powder may be adhered in a continuous layer as shown in FIG. 2A or in a noncontinuous layer as shown in FIG. 2B.

A presently preferred apparatus for adhering copper powder to a web 45 of plastic film is illustrated in FIGS. 3 and 4. Typically the web 45 is about 2½ inches wide and 4 to 25 mils. thick. Irrigation hose, such as shown in FIGS. 1 and 2, is produced from such a web in lengths of 3600 feet to 9000 feet in large diameter rolls. An upper funnel 46 is positioned above a lower funnel 47, with copper powder 48 being fed from a reservoir 49 into the upper funnel 46. The upper funnel 46 is mounted on the lower funnel 47 by supports 50, with the copper powder feeding through a screen 51 into the lower funnel. A vibrator unit 52 may be attached to the upper funnel 46, and a plurality of balls 53 desirably are placed on the screen 51 for improved uniformity of copper powder feed. The vibration produced by the vibrating unit 52 may be varied for regulating flow rate of copper powder from the reservoir to the web.

A brush assembly 55 is supported below the lower funnel 47 by a coupling pipe 56, with brushes 57 carried in a brush holder 58 and extending downward to brush along the web 45 as the web is moved to the left past the unit.

The copper powder is fed from the reservoir 48, through the upper funnel 46 and the screen 51 into the lower funnel 47, the coupling pipe 56 and the holder 58 to the holder outlet feed line 60 for gravity feed of the copper powder onto the moving web. The brushes 57 are closely packed and preferably held in place by a wrap 61. The lower end of the feed line 60 is positioned quite close to the web for controlling positioning of the copper powder on the moving web. The brushes rub the powder on and into the web surface for adhering the copper powder to the web, and also serve to reduce or prevent escape of the copper powder.

Adhesion of the copper powder to the surface of the web may be improved by heating the surface with a web heater 65, which typically may be a heated iron or a pointed flame or otherwise as desired.

Also, adhesion of the copper powder to the moving web may be improved by producing an electrostatic charge on the web from an electrostatic charge generator 66. A conventional static charge generator unit is satisfactory for this purpose.

Alternative embodiments for adhering the copper powder to the plastic film are shown in FIGS. 5 and 6. The copper powder is fed from a reservoir 70 through a nozzle 71 onto a rotating wheel 72. The copper powder is transferred from the rotating wheel 72 to a second rotating wheel 73 which transfers the copper powder onto the surface of the web 45. Preferably the wheel 72 has a rim 74 of felt, and the wheel 73 has an O-ring 75 as a rim. Desirably, a wiper 76 is positioned at the rim 74 of the wheel 72 for distributing the copper powder and pressing it into the surface of the rim. Also desirably, the wheel 72 rotates in bearings 79 on a shaft 80, with the shaft having an internal passage 81 for feeding water from a source 82 to the felt rim 74 for maintaining the rim wet. The wet felt rim enhances the distribution of the copper powder and minimizes the potential of loose copper powder forming a copper cloud. The O-ring rim 75 on the wheel 73 provides for close control of the size of the adhered copper layer. Other wheel rim configurations can be utilized to provide various shapes and sizes for the copper powder layer, such as narrow, wide, serpentine, in parallel lines, continuous and interrupted.

An embodiment utilizing a first wheel 72 and a second wheel 73 is shown in FIG. 5, while an embodiment utilizing only the first wheel 72 for directly adhering the copper powder to the web is shown in FIG. 6. In FIG. 7, an alternative shape for the rotating wheel 72 is shown at 72A, with the periphery of the wheel being shaped to produce the desired shape of the copper powder layer. Typically the wheels are about 2 inches to 3 inches in diameter and rotate at about 500 to 3,000 rpm.

Figure 10A:
FIG. 10A is a sectional view taken along the line 10—10 of FIG. 10.

The plastic film to which the copper powder is adhered may be produced by various conventional manufacturing techniques, including extruding, blowing and molding, and the copper powder may be adhered to a surface of the plastic during the plastic forming operation. A conventional plastic profile extruder 85 is shown in FIG. 10, with the extruder producing a web 86 having the cross section configuration of the die 87 at the outlet of the extruder. In the embodiment shown in FIG. 10, the extruded web 86 has the cross section shown in FIG. 10A. Copper powder from a reservoir 88 is dusted onto the web 86 through a nozzle 89 while the surface of the web is still hot and soft from the extrusion operation before final surface solidification, thereby improving adhesion of the copper powder to the surface.

An alternative extruder configuration is shown in FIG. 8, with a conventional cross head plastic extruder 92 forming a tube of plastic 93, with copper powder fed from a reservoir 94 through a nozzle 95 at the cross head, into the interior of the tube 93 for adhesion of the copper powder to the inner surface of the tube before final surface solidification.

The application of the copper powder to a surface of plastic formed by the blowing method is illustrated in FIG. 9. The plastic is fed from an extruder 100 into a die ring 101, with air under pressure being introduced into the interior of the die ring through a line 102. A tube or bubble 103 of plastic is produced, rising above the die ring. The bubble 103 is pulled upward, with the plastic cooling and solidifying. The bubble is closed into a flat double sheet as it travels over a top roller 104. The opposite edges of the sheet are trimmed at trimming rolls 105, with one layer of film being wrapped onto a roll 106 and the other layer of film being wrapped onto a roll 107.

Copper powder is introduced inside the bubble 103 through a line 108 with the copper powder being fed from a reservoir. Desirably, a fan 109 is positioned within the bubble to assist in distributing the copper powder more uniformly onto the inner surface of the bubble and maintaining the powder suspended within the bubble.

Figure 11:
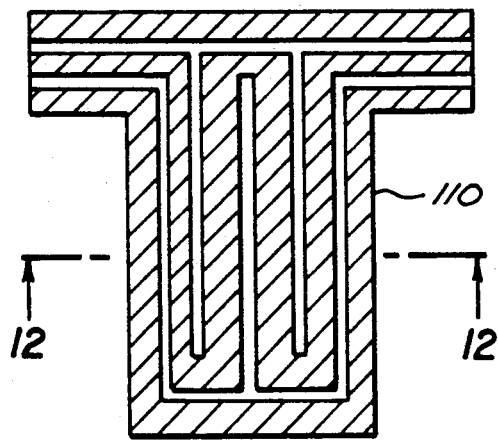
FIG. 11 is a top view of a die casting mold illustrating another alternative, embodiment of the invention.
Figure 13:
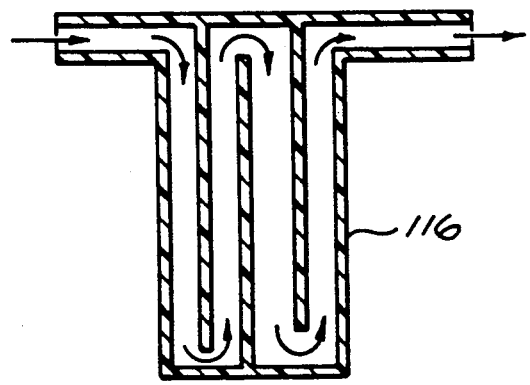
FIG. 13 is a sectional view of a casting produced by the mold of FIGS. 11 and 12.
Figure 12:
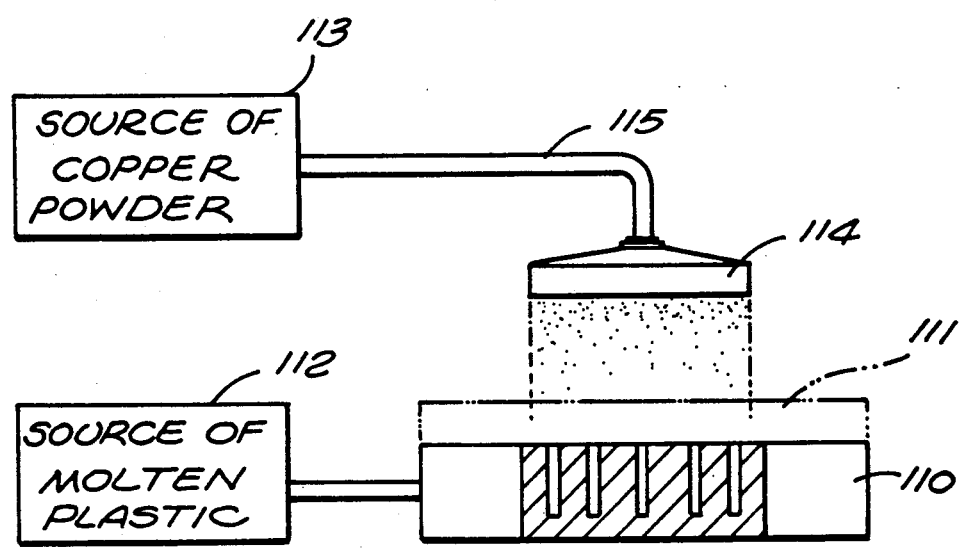
FIG. 12 is a sectional view taken along the line 12—12 of FIG. 11.

Another alternative arrangement for producing plastic products with copper powder adhered to a surface thereof is shown in FIGS. 11 and 12. A mold die 110 is shown in FIGS. 11 and 12, with a mold cover 111 enclosing the die shown in FIG. 12. The mold may be a conventional casting or injection mold, with a source of molten plastic 112 connected to the mold for feeding the molten plastic into the mold die. Prior to introducing the molten plastic, copper powder from a source 113 is dusted into the mold cavity, typically from a nozzle 114 fed from a line 115. After the copper powder is dusted into the mold die 110, the cover 111 is closed and the molten plastic is introduced. After the plastic hardens, the molded product 116, shown in FIG. 13, is removed, with the copper powder adhered to the surfaces of the product. Typically the molded product 116 is a drip irrigation emitter which is inserted into the side of a hose for a water flow of one gallon per hour with a hose pressure of 25 psig. The flow passages in the emitter are usually inaccessable and very small, with a high degree of susceptibility to becoming blocked by growths. The presence of the copper powder along the flow passages substantially increases the operating life of such emitters.

We claim:

1. A multichamber drip irrigation hose, comprising
a larger primary tube and a smaller secondary tube of flexible water impermeable material and joined at a common wall, with each of said tubes having an inner surface,
said common wall having a series of first passages facing the interior of said primary tube in communication with the interior of said secondary tube,
said secondary tube having a series of second passages leading from the interior of said secondary tube to the exterior, and
copper powder adhered to at least one of said inner surfaces along the length of the hose.

2. A hose as defined in claim 1 wherein said copper powder is in a continuous layer.

3. A hose as defined in claims 1 wherein said copper powder is in a non-continuous layer.

* * * * *